United States Patent
Hauth

[11] 3,727,727
[45] Apr. 17, 1973

[54] BRAKE METHOD AND DEVICE

[75] Inventor: Jean-Marc Laurent Hauth, Pont-A-Mousson, France

[73] Assignee: Pont-A-Mousson S.A., Pont-A-Mousson, France

[22] Filed: July 31, 1970

[21] Appl. No.: 59,918

[30] Foreign Application Priority Data

Aug. 11, 1969 France.................................6927515

[52] U.S. Cl..................................188/72.9, 188/72.2
[51] Int. Cl. .........................F16d 55/08, F16d 55/16
[58] Field of Search...................188/71.9, 72.6, 72.2, 188/72.9, 23.3

[56] References Cited

UNITED STATES PATENTS

| 3,185,244 | 5/1965 | Press | 188/72.6 |
| 3,422,934 | 1/1969 | Hambling | 188/72.2 |
| 3,269,490 | 8/1966 | Swift | 188/72.6 |
| 3,236,336 | 2/1966 | Harrison | 188/71.9 |
| 3,405,785 | 10/1968 | Schmid | 188/72.2 |

FOREIGN PATENTS OR APPLICATIONS 1,034,172  6/1966  Great Britain......................188/72.2

Primary Examiner—George E. A. Halvosa
Attorney—J. Delattre-Seguy

[57] ABSTRACT

Friction disc braking method and device in which the disc is braked by pad means inserted between the disc and a support face slightly oblique relative to the disc. The pad means have a bearing face opposed to the friction face thereof and parallel to the support face. The pad means are applied into braking engagement with the disc in a direction which is oblique relative to the disc and opposed to the movement of the disc by bearing against a fixed body in such manner that the reaction is exerted in a direction slightly oblique relative to the normal to the disc and toward the disc.

1 Claim, 6 Drawing Figures

INVENTOR:
Jean-Marie Laurent HAUTH
by: J. Delattre-Seguy
Attorney

BRAKE METHOD AND DEVICE

The present invention relates to brakes and has mainly for purpose to improve brake stability and efficiency.

It is known that the stability of a brake is the quality by which the braking torque remains constant for a given actuating force, irrespective of variations in the coefficient of friction of the friction materials employed (for example due to heating and variations in the hygrometric degree or due to splashes of liquids such as water or oil).

The efficiency is the capacity of a brake to exert a high braking torque.

In the known technique, it is recognized that the qualities of stability and efficiency are not independent variables but interrelated by the degree of self-application of the brake. Indeed, it is observed that self-applying brakes, that is, roughly those in which the mechanism itself tends to amplify the braking force furnished by the control device, are efficient but unstable and that, conversely, brakes of the self-releasing type are stable but have low efficiency and usually require a powerful mechanism for amplifying the braking force furnished by the operator.

Research carried out by the Applicant has revealed that the self-applying degree of a friction brake is not the sole factor interrelating the braking stability and efficiency but that by a suitable choice of the direction of the brake-applying force the qualities of self-applying brakes and those of self-releasing brakes can be obtained without the drawbacks thereof.

The object of the invention is to provide an improved method of friction braking a moving element having a rubbing surface, comprising applying a braking force on said element in a slightly oblique direction with respect to the direction of movement of said rubbing surface and in the opposite direction to said direction of movement, the reaction to the braking force being afforded by a fixed body in such manner that the thrust reaction is slightly oblique relative to the normal to the rubbing surface and exerted in a direction toward said surface.

With this improved method it is possible to achieve high braking stability and efficiency, as will be shown hereinafter.

Another object of the invention is to provide a braking device for carrying out the aforementioned braking method and intended for the friction braking of a moving element having a rubbing surface, said device comprising at least one fixed support element having a plane support face which is slightly oblique relative to said rubbing surface and at least one brake pad means having a plane friction face parallel to said rubbing surface and an opposed plane bearing face which is slightly oblique relative to said friction face and has the same inclination as said support face of said fixed element, said brake pad means being connected to an actuating rod which is oriented slightly obliquely with respect to said rubbing surface so as to be inserted for braking between said plane support face of said fixed support element and said rubbing surface in a direction opposed to that of the movement of said rubbing surface.

According to another feature of the invention, the plane support face of the pad, which is almost parallel to or slightly oblique relative to the rubbing surface, has a low coefficient of friction.

Owing to this feature, in addition to the fact that the braking force is moderate, the plane support face is not subjected to wear and therefore not deformed so that the orientation of the reaction of the support remains constant during the life of the brake and the brake remains stable.

Further features and advantages of the invention will be apparent from the ensuing description with reference to the accompanying drawings.

Figure 6:
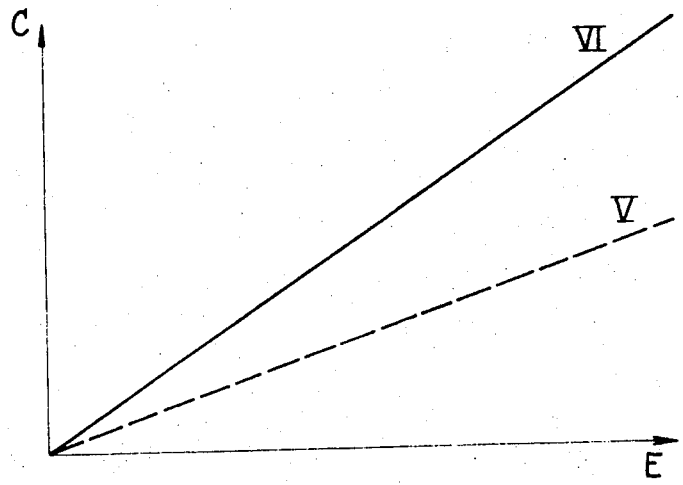
Figure 5:
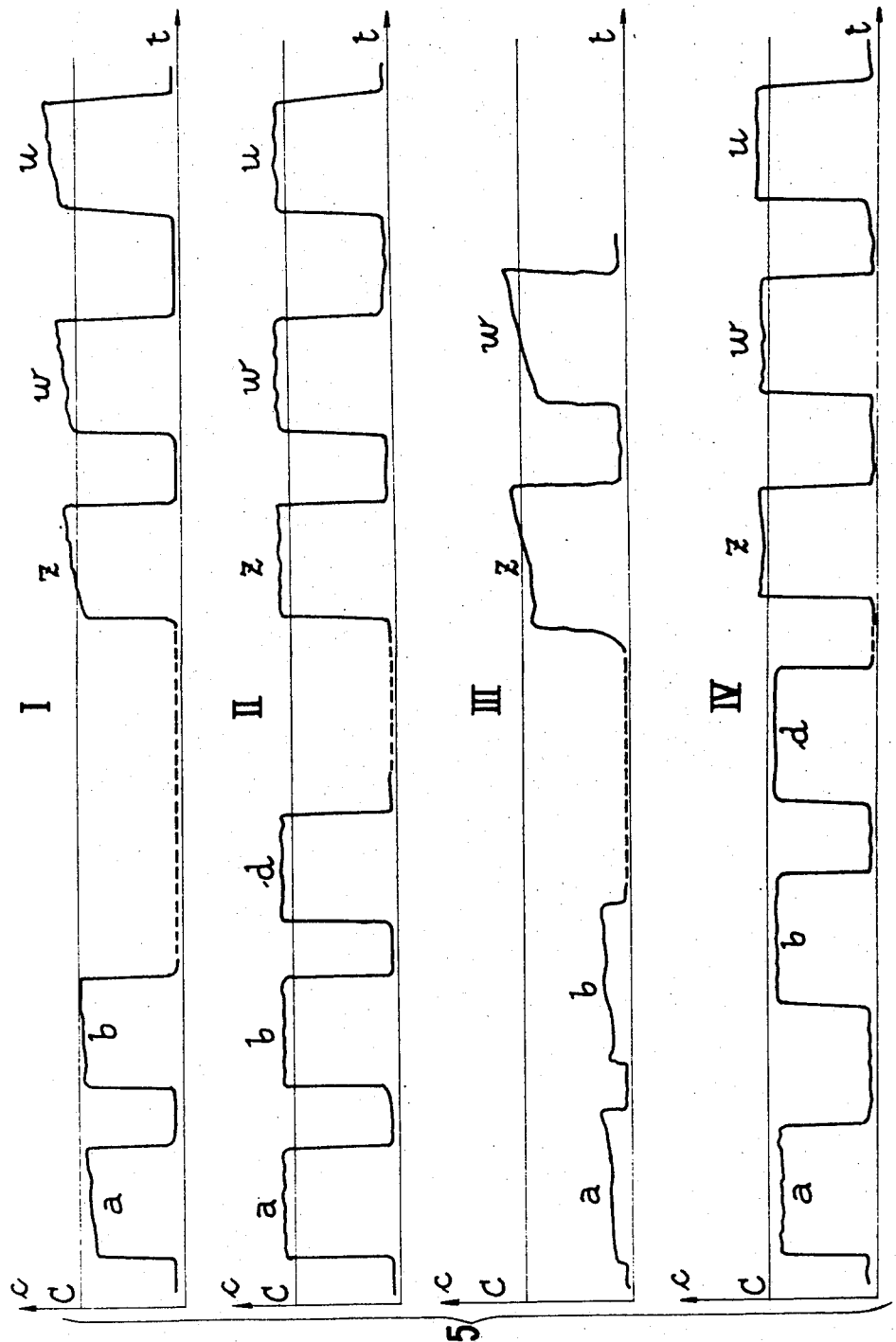

FIG. 5 shows, in comparative diagrams of the braking torque as a function of time, the performance of a disc brake according to the invention (diagrams II and IV) and a disc brake of known type (diagrams I and III) in the course of two braking tests, and FIG. 6 shows the variation in the braking torque C as a function of the brake-applying force E at V for a disc brake of known type at VI for a disc according to the invention.

Figure 1:
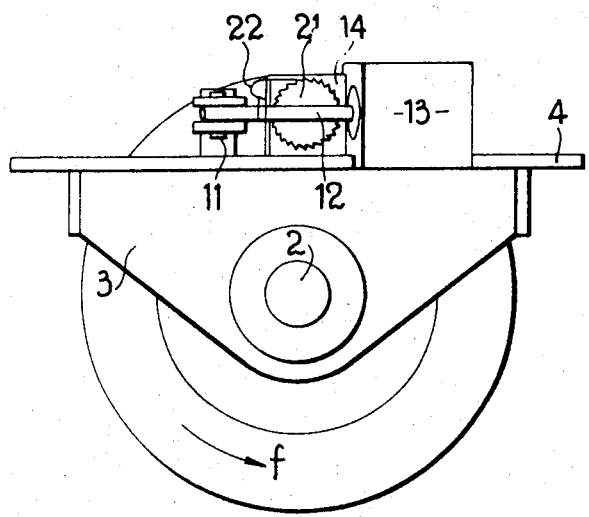
FIG. 1 is an elevational view of a brake according to the invention.
Figure 2:
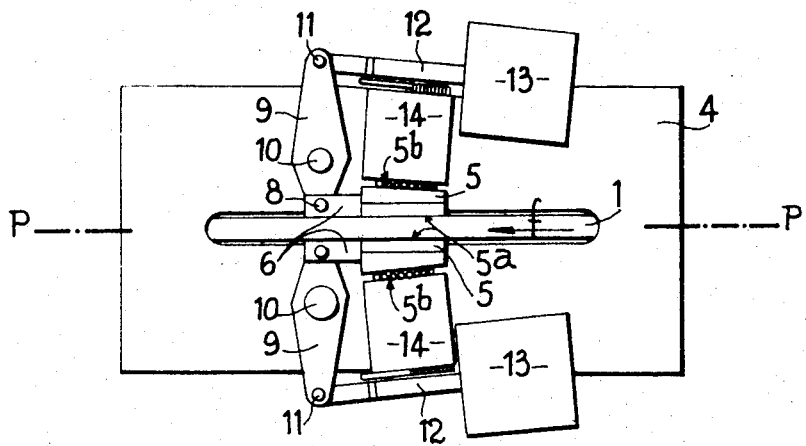
FIG. 2 is a plan view of the brake shown in FIG. 1.
Figure 3:
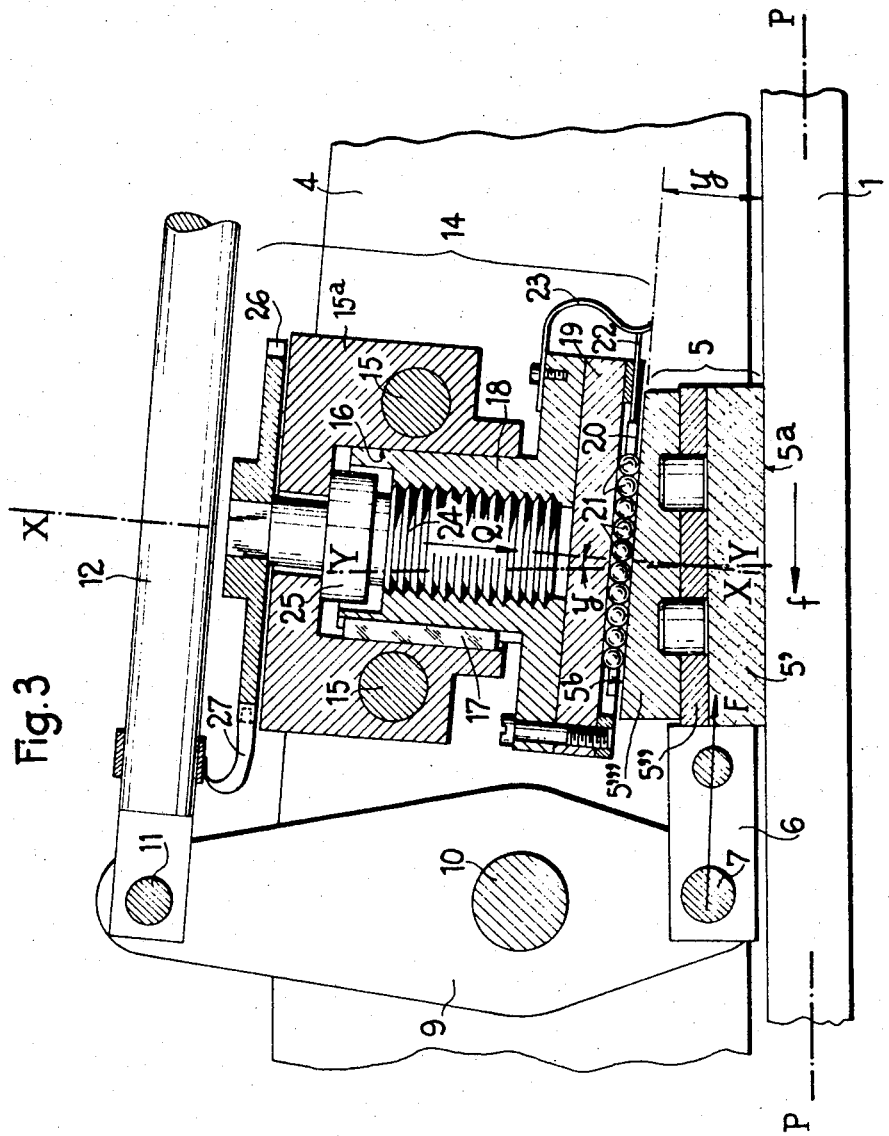
FIG. 3 is a partial plan view of the brake, with parts cut away and on an enlarged scale.

According to the embodiment shown in FIGS. 1-3, the brake according to the invention comprises a rubbing disc 1 which is fixed to a coaxial wheel (not shown) to be braked integral with a rotary axle 2. The latter is journalled in a bracket or block 3 integral with a fixed support or base 4 mounted on a vehicle (not shown).

The support 4 carries fixed support elements and brake-applying elements of a pair of means defining a brake pad 5 mounted on each side of the disc 1 symmetrically relative to the median plane P-P of this disc (FIGS. 2 and 3).

Each pad means 5, which may be composite, as seen in FIG. 3 where it comprises three parts 5',5'',5''', has a friction face 5a parallel to the disc 1 and a bearing face 5b which is slightly oblique with respect to the face 5a with which it makes an acute angle y of small value. This angle is preferably, but not necessarily, less than 20°.

This pad means 5 is integral with a brake-applying rod 6 which is slightly oblique relative to the disc 1 and for example secured to the thickest part of the pad means 5. The rod 6 is pivoted at 7 to one end of a force amplifying lever 9 which is pivotably mounted on the support by a fixed pin 10 and pivoted at 11 at the end of its longer branch to the rod 12 of a servomotor or fluid motor 13 connected to a source of fluid under pressure (not shown).

A fixed support device 14 is provided for each pad means (FIGS. 1 and 2). This device comprises (FIG. 3) a support block 15a fixed to the support 4 for example by screws 15. This block has a cylindrical cavity 16 having an axis X—X which is perpendicular to the bearing face 5b of the pad means 5 and is consequently slightly oblique relative to a line Y—Y perpendicular to the plane face of the disc 1. The angle between X—X and Y—Y is therefore equal to the aforementioned angle y between the faces 5a and 5b of the pad means. Slidably keyed in the cylindrical cavity 16 by means of a key 17 is a nut 18 which is part of a device for taking up wear of the pad means described hereinafter. The nut 18 carries a support or thrust plate 19 which is perpendicular to the axis X—X and therefore oblique with respect to the disc 1 and makes with the latter the angle y. This thrust plate 19, along which the support or thrust reaction is exerted, must be very strong and undeformable since this reaction is of high magnitude (for a disc brake having a coefficient of friction of 0.3 a braking torque of 100 mkg, and a rubbing radius of 150 mm, the reaction is of the order of 1 metric ton). The support face that the plate 19 affords the brake pad means 5 (since this face confronts the bearing face 5b of the pad) has a low coefficient of friction so as to avoid wear. In the presently-described embodiment, a roller bearing cage 20, combined with parallel rollers 21 of small diameter and therefore of small thickness, is interposed between the support plate 19 and the pad means 5 so as to constitute a plane rolling support plate. The cage 20 is movable with respect to the plate 19 and extended by a rod 22 engaged by a resiliently yieldable return element such as a spring strip 23 fixed to the nut 18. The strip 23 biases the cage 20 in the direction of the end of the plate 19 remote from the disc 1.

Screwed inside the nut 18 is a screw 24 which is part of a device combined with the pad means for compensating or taking up wear. This screw has an axis X—X and is prevented from moving axially with respect to the support block 15 by a flange 25 and a toothed wheel 26 or ratchet wheel integral with the head of the screw.

The device for taking up wear is completed by a spring strip 27 which is fixed to the rod 12 of the fluid motor 13 and constitutes a pawl which rotates the wheel 26 and therefore the screw 24. It will be understood that the coaction of the screw 24 and nut 18 causes the support plate 19 to be shifted along the axis X—X.

The device operates in the following manner:

Let it be assumed that the disc 1 which rotates in the direction $f$ must be braked. When fluid under pressure is supplied to the fluid motors 13, the thrust of the rods 6 is amplified and converted into braking forces F acting through the rods 6. These forces are inclined at the small angle y relative to the corresponding surface S of the disc (see FIGS. 3 and 4 and diagram A).

Before each pad means 5 is forced into the spaced defined by the disc 1 and the corresponding support plate 19, the roller cage 20 is biased by the spring 23 in the direction of the end of the plate 19 remote from the disc 1. When the pad means 5 enters this space, it will be understood that it moves with respect to the plate 19 by rolling on the rollers 21 a distance twice as great as that of the cage 20.

Owing to its wedge shape, the pad means 5 subsequently stops and rubs against the disc 1 which it brakes.

The brake is so arranged that the stoppage of the movement of each pad means 5 by a wedging action occurs before the cage 20 of the rollers 21 reaches the end of its travel toward the end of the plate 19 nearer the disc 1 so as to avoid a premature stoppage of this cage and the substitution of a sliding movement of the face 5b of the pad means 5 on the rollers 21 (which would be stationary) for the rolling movement having a very low friction value.

The brake is released without difficulty in the following manner:

The fluid motors 13 are actuated in the direction for withdrawing the rods 12 and each pad means 5 is withdrawn by rolling on the rollers 21. As soon as each pad means 5 is sufficiently disengaged from the space between the rollers 21 and the disc 1 to cease to rub against the disc, which corresponds to the end of travel of the fluid motors 13, the cage 21 is released and the return spring 23 returns the cage to the part of the plate 19 remote from the disc 1.

It has been assumed that the friction or brake lining 5' of the pad means 5 is new. In this case, the device for taking up wear has not operated, since the pawl 27 which moves with the rod 12 has moved a distance less than the dimension of one tooth of the ratchet wheel 26. Consequently the pawl 27 remains bearing against the same tooth of the ratchet wheel. On the other hand, as soon as the brake lining 5' of the pad means 5 has undergone wear the travel of the pad means 5 in the direction opposed to that of arrow $f$ increases to brake under the effect of the force F. The rod 12 has therefore a travel which is longer than the normal travel and exceeds the pitch of the teeth of the ratchet wheel 24. The pawl 27 then engages the following tooth which, owing to the inclination of the flanks of the teeth, is without effect on the wheel 26 during the forward travel of the rod 12 of the fluid motor 13. On the other hand, on the return movement of each rod 12 for disengaging the corresponding pad means 5, the pawl 27 rotates the ratchet wheel 26 and causes the plate 19 to be moved toward the disc 1 a distance which corresponds to the additional travel of each rod 12 and therefore to the wear of the pad means 5.

This brake has very important advantages resulting from the orientation of each rod 6 actuating the corresponding pad means 5, the shape of the latter and the inclination of the support plates 19. This brake has very high efficiency and very high stability. Reference will now be made to the comparative diagrams shown in FIG. 4, the diagram A relating to the brake of the embodiment just described and the diagram B to a brake of known type.

In diagram A, the braking force F applied at 0 is slightly oblique, namely at an angle y with respect to the braking surface S and is exerted in a direction opposed to the direction of movement $f$ of the disc 1.

The support reaction Q perpendicular to the force F is therefore almost perpendicular to the surface S and exerted in a direction towards the latter.

The resultant RO of these forces makes with the normal O—Y an angle $x$ which is the angle of rubbing, that is, the angle corresponding to the coefficient of friction. This angle can vary from $(x-e)$ to $(x+e)$. The resultant RO has for normal and tangential components forces NO and TO which respectively vary between $N^1O$ and $N^2O$ and between $T^1O$ and $T^2O$ for variations in the angle of friction $x$ between $(x-e)$ and $(x+e)$.

It can be seen that when the rubbing angle varies between these limits, the limits of the tangential component $T^1O$ and $T^2O$ remain close to TO.

By way of comparison, reference will now be made to the diagram B relating to a disc brake of known type which is slightly self-applying and provided with brake pad means applied to the disc with a force which is practically normal to the surface of the disc. The direction of the braking force F applied to the rubbing surface S of a moving element moving in the direction of arrow $f$ is almost normal to this surface S. In practice, the braking force is exerted in a direction which makes an acute angle $a$ with the line O–Y normal to this surface (in other words, the angle $y$ exceeds and is in the neighbourhood of 180°) and preferably in the direction of movement of the surface S.

The thrust reaction Q coming from a fixed support is oriented in a direction perpendicular to the force F and in the opposite direction to that of the arrow $f$ along a line which is slightly oblique relative to the surface S.

The friction reaction R, which is the resultant of the braking force F and the thrust reaction Q, therefore makes with the line O–Y an angle $x$ which is the rubbing angle, that is, the angle corresponding to the coefficient of friction.

If T and N are respectively the tangential and normal component forces of the resultant R, T varies from $T'_1O$ to $T'_2O$ when the rubbing angle varies from $(x-e)$ to $(x+e)$. The variation $T'_1T'_2$ of the component T is, as can be seen, much greater than the variation $T_1T_2$ (diagram A) of the brake according to the invention. It represents the instability of the known brake whereas the diagram A shows the high stability of the brake according to the invention.

Diagram A shows that the variation in the angle of friction has practically negligible effect on the tangential component.

Figure 4:
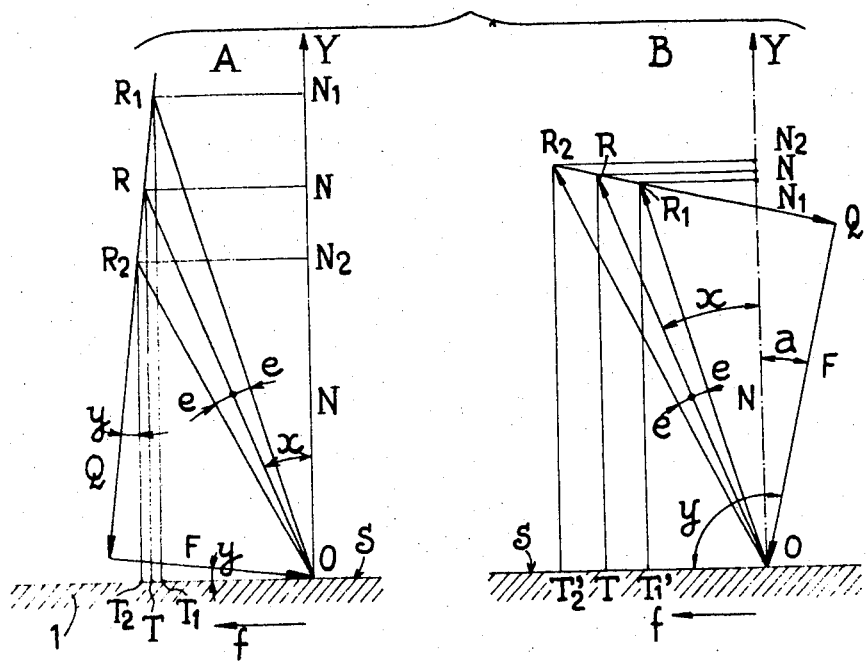
FIG. 4 is a diagram showing a comparison at A and B between the graphs of the forces involved respectively in a brake employing the method according to the invention and in a brake of conventional type which is slightly self-applying.

Moreover, a comparison of the values of the brake force F in FIG. 4 shows that the braking force F in the case of diagram A according to the invention has, everything else being equal, (that is, for given angles and variations of angles of rubbing $x$ and $e$, and for a given resultant R of the braking forces F and support reaction Q) a lower value than that of the braking force F of diagram B. This is another notable advantage of the invention which results in high efficiency, that is, either a given braking torque for a much lower braking force, or a braking torque substantially higher than that obtained with the conventional self-applying brake, notwithstanding the fact that the braking method according to the invention has a self-releasing action. These results are therefore possible owing to the fact that in the braking method according to the invention the brake-applying force F is oriented almost parallel to and in fact at a very small angle $y$ relative to, the rubbing surface S and in the opposite direction to that of the movement of this surface so that there is self release and the thrust reaction Q is oriented almost normally to, or with a small acute angle relative to the normal O–Y to the rubbing surface. The acute angle that the braking force must make with the rubbing surface S or that the support reaction Q must make with the normal O–Y preferably should not exceed 20°.

It will be observed that: for a given braking torque corresponding to a tangential force equal and opposed to TO (FIG. 4, diagram A) the braking force F to be exerted in the direction of the rod 6 is relatively low. It is all the lower as the frictions are very small between the oblique bearing face 5b of the pad means 5 and the cage 20 of the rollers 21. Moreover, the force for releasing the brake pad means 5 remains moderate owing to the effect of the rolling arrangement (20,21).

The stability of the brake is due in particular to the constancy of the oblique support offered by the plate 19 and the roller cage 20 which enables a constant orientation of the thrust reaction Q to be maintained. The sturdy nature of this support arrangement precludes any wear or deformation of this support arrangement which would tend to modify the orientation of the thrust reaction Q and consequently adversely affect the stability of the brake. Indeed it must be remembered that this support arrangement constituted by the plate 19 and the rollers 21 must resist a reaction Q of considerable intensity when braking a vehicle at high speed.

Owing to the combination of the pad means 5 and the wear compensating device, the travel of this pad means when braking remains limited, even after wear, so that braking is always possible, whereas in the absence of this wear compensating device, any wear of the friction face 5a would result in a relatively great additional travel of the brake pad means and would very rapidly become greater than the movement it is possible to impart to the pad means 5 by means of the fluid motors 13. This would be equivalent to a situation in which it is impossible to achieve a braking. This device compensating or taking up wear is therefore essential.

The following examples will illustrate the qualities of the brake according to the invention:

First Example (FIG. 5) — Stability

The Applicant recorded the variations in the braking torque as a function of time in respect of two disc brakes, one of which was of known type in which the brake pads were applied to the disc in the direction normal to the surface of the disc (diagrams I and III) and the other according to the invention (diagrams II and IV).

In the four diagrams, the braking torque is plotted along the axis $c$ of the ordinates and the time is plotted along the axis $t$ of the abscissae. The ordinate C of the normal mean braking torque which must as a rule remain constant is represented by a thin line.

The dotted lines recording the braking torques have evenly-spaced trapezoidal projections which correspond to a braking of constant intensity at regular intervals.

The braking torques were measured under the following conditions:

In a first test (diagrams I and II), the brakes were tested under the usual current conditions of utilization with the first brakings in the cold state and following brakings in the hot state as the rubbing surfaces heated up. The coefficient of friction is usually, under normal conditions of utilization, between 0.15 and 0.45 when the temperature of the rubbing surfaces varies from 20° to 400°C owing to the heat generated by the braking.

In diagram I relating to the brake of known type, it will be observed from the first brakings in the cold state $a$, $b$ that the value C of the normal braking torque has not yet been reached. The crests of the trapezoidal profiles $a$, $b$ are on a line having an ascending tendency. After heating of the rubbing surface up to around 350°C, the brakings z, w, u have crests which exceed the value C. The braking torque increases. However, it remains unstable during each braking since the crests of the trapezoidal profiles have an ascending and unstable tendency from one braking to the other since the ascending profile is higher and higher.

In the case of the brake according to the invention (diagram II), the trapezoidal profiles a,b,d of the first brakings in the cold state are very regular with crests aligned horizontally above the ordinate of the mean theoretical torque C. The braking capacity is therefore integral. After many brakings and heating of the rubbing surfaces, the temperature of the disc is of the order of 350°C. The trapezoidal profiles z, w, u of the brakings in the hot state have crests which are still above the mean torque C and roughly horizontally aligned. This shows that the braking capacity has been maintained and that the braking is regular.

The diagram II therefore illustrates the stability of the brake according to the invention compared with the instability of the brake of known type (diagram I).

In the course of a second test (diagrams III and IV), the coefficient of friction was modified artificially by impregnating the disc and the brake linings of the brake pad means with oil. The presence of oil lowers the value of the coefficient of friction to 0.05.

Usually, the variation in the coefficient of friction of the brake linings on the disc affects the braking torque. When the coefficient of friction diminishes, the braking torque also diminishes. This is revealed by diagram III.

In this diagram III showing the performance of the disc brake of known type, it can be seen from the first brakings a and b that the braking torque has considerably diminished since the crests of the trapezoidal profiles are well below the line C. The loss of efficiency of the known brake is reckoned to be about 80–90 percent of the mean torque C. It is only after a very long period of time, represented by the dotted line, that the brake of known type recovers its braking capacity as shown by the trapezoidal profiles z, w.

Further, it is observed that the trapezoidal profiles corresponding to the brakings are very irregular : the crests a and b are not horizontal but are roughly ascending lines. The crests of the profiles z and w deviate still further from the horizontal and distinctly vary in accordance with ascending lines. This reveals a considerable irregularity in the braking torque upon each braking, even a long time after the recovery of the braking capacity.

The diagram IV relating to the brake according to the invention contrasts considerably with the diagram III of the known brake. Indeed, the first three trapezoidal profiles a, b, c, corresponding to the first three brakings indicate only a slight drop in the braking torque after impregnation with oil.

The maximum drop relative to the normal torque C is of the order of 20 percent. The crests of the profiles a, b, c remain roughly horizontally aligned, which corresponds to great regularity in the braking torque. The normal braking capacity is fully recovered at the end of a very short period of time which is much shorter than in the case of the known brake. The trapezoidal profiles z, w, u illustrate brakings after full recovery of the braking capacity. It can be seen that the crests of the trapezoidal profiles z, w, u are roughly horizontally aligned which reveals regularity of the braking.

Second Example (FIG. 6) — Efficiency

FIG. 6 is a diagram showing the variations in the braking torque (axis C of the ordinates) as a function of the direct unassisted brake-applying force, (axis E of the abscissae) for a disc brake of known type having no self-application (dotted line V) and for a disc brake according to the invention (full line VI).

This graph represents the measurements of the braking torques for brakings effected under the same conditions of coefficient of friction and intensity of braking force E, these intensities being progressively increased in the course of successive brakings. The braking torques are therefore proportional to the forces E. It will be observed that in respect of the brake according to the invention the braking torques are roughly twice those of the brake of known type. This shows the efficiency of the brake according to the invention.

In conclusion, the remarkable stability or fidelity of the brake according to the invention affords greater safety of operation. For a given brake-applying force, irrespective of the temperature of the brake (the brake lining can even burn without resulting in fading, that is, loss of the frictional qualities under the influence of the temperature) and even if there accidentally appears on the rubbing surface of the disc a film of water, a layer of ice or splashes of oil, the braking capacity is maintained in a regular manner and stability remains excellent.

The high efficiency of the brake in most cases renders unnecessary the use of a device assisting the application of the brake so as to highly increase the force applied.

The brake according to the invention is of utility in particular for :
very rapid vehicles (safety);
industrial machines operating in a water, steam or oil environment;
continuous braking, the brake being employed as a friction-type slowing means.

Although a specific embodiment of the invention has been described, many modifications and changes may be made therein without departing from the scope of the invention.

Thus, the pad means 5 instead of being pushed by the rod 6 in the direction for braking can be pulled by a rod disposed on the opposite side of the pad means to the rod 6, that is, connected to the thicker end of the pad means.

Further, the fluid motors or servomotors shifting the pad means 5 can be placed near these pad means with a direct connection between the piston rod and the pad means, with no interposition of a force amplifying lever, such as lever 9. In this case, the wear compensating device, which is controlled by the travel of the rod of the fluid motor actuating the pad means must be arranged in a different manner, in accordance with known arrangements for taking up wear.

Having now described my invention what I claim and desire to secure by Letters Patent is :

1. A self-releasing friction braking device for braking a moving element having a rubbing surface and adapted to move in a first direction, said device comprising at least one fixed support element having a plane support face which is slightly oblique relative to said rubbing surface, at least one brake pad means having a plane friction face parallel to said rubbing surface and an opposed plane bearing face which is slightly oblique relative to said friction face and parallel to said support face of said fixed support element, a shifting rod connected to said brake pad means and oriented slightly obliquely with respect to said rubbing surface so as to be inserted for braking between said plane support face of said fixed support element and said rubbing surface in a second direction opposed to said first direction, a set of parallel rolling elements, a cage in guiding relation to said parallel rolling elements, and resiliently yieldable return means combined with said cage, said set of rolling elements being interposed between and engaging said plane support face and said bearing face of said pad means, and said rolling elements being rollable along said plane support face in opposition to said resiliently yieldable return means.

* * * * *